(12) United States Patent
Hawkins, Jr. et al.

(10) Patent No.: US 9,109,663 B2
(45) Date of Patent: Aug. 18, 2015

(54) INPUT CLUTCH ASSEMBLY FOR INFINITELY VARIABLE TRANSMISSION

(75) Inventors: Glen S. Hawkins, Jr., Indianapolis, IN (US); Brian Schoolcraft, Crawfordsville, IN (US); James A. Raszkowski, Indianapolis, IN (US); David E. Earhart, Brownsburg, IN (US); Gary Reichanadter, Mooresville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 376 days.

(21) Appl. No.: 13/228,632

(22) Filed: Sep. 9, 2011

(65) Prior Publication Data

US 2012/0122624 A1 May 17, 2012

Related U.S. Application Data

(60) Provisional application No. 61/413,530, filed on Nov. 15, 2010.

(51) Int. Cl.
*F16H 37/02* (2006.01)
*F16H 3/44* (2006.01)
*F16H 37/08* (2006.01)
*F16H 37/10* (2006.01)

(52) U.S. Cl.
CPC ............... *F16H 3/44* (2013.01); *F16H 37/086* (2013.01); *F16H 2037/101* (2013.01); *F16H 2037/107* (2013.01)

(58) Field of Classification Search
CPC .......................... F16H 2037/101; F16H 37/086
USPC .................................................. 475/207, 219
See application file for complete search history.

(56) References Cited

U.S. PATENT DOCUMENTS

| | | | |
|---|---|---|---|
| 5,720,687 A * | 2/1998 | Bennett | 475/214 |
| 6,126,567 A | 10/2000 | Hoge et al. | |
| 8,308,597 B2 * | 11/2012 | Hiraoka et al. | 475/80 |
| 2007/0021259 A1 * | 1/2007 | Tenberge | 475/5 |
| 2007/0149342 A1 * | 6/2007 | Guenter et al. | 475/214 |
| 2009/0023545 A1 * | 1/2009 | Beaudoin | 476/42 |
| 2010/0304908 A1 * | 12/2010 | Kikukawa et al. | 474/166 |
| 2011/0021302 A1 * | 1/2011 | Panizzolo et al. | 475/207 |

FOREIGN PATENT DOCUMENTS

| | | |
|---|---|---|
| EP | 0172701 A1 | 2/1986 |
| JP | 11-108147 A | 4/1999 |
| JP | 2006-097777 A | 4/2006 |

OTHER PUBLICATIONS

NPL, snapshot of www.merriam-webster.com, definition of "variator" retrieved on Sep. 14, 2014.*
International Search Report and Written Opinion, Apr. 24, 2012, Korean Intellectual Property Office.

* cited by examiner

*Primary Examiner* — Justin Holmes
*Assistant Examiner* — Stacy Fluhart
(74) *Attorney, Agent, or Firm* — Taft Stettinius & Hollister, LLP; Stephen F. Rost

(57) ABSTRACT

The present invention provides an infinitely variable transmission for a powered vehicle which includes a power source. The transmission includes an input shaft and an output shaft, the output shaft being spaced from the input shaft. The transmission further includes a variator coupled between the input shaft and output shaft. In addition, at least two planetary gearsets are disposed adjacent to the variator and an input coupler is configured to selectively couple the variator to the power source.

8 Claims, 8 Drawing Sheets

INPUT CLUTCH ASSEMBLY FOR INFINITELY VARIABLE TRANSMISSION

RELATED APPLICATIONS

This application claims priority to U.S. Provisional Patent Application Ser. No. 61/413,530, filed Nov. 15, 2010, which is hereby incorporated by reference in its entirety.

FIELD OF THE INVENTION

The present invention relates to a transmission for a powered vehicle, and in particular to a multi-axis gearing configuration and input coupler for a transmission that includes a variator.

BACKGROUND

A transmission is an apparatus through which power and torque can be transmitted from a vehicle's power unit to a load-bearing device such as a drive axis. Conventional transmissions include a variety of gears, shafts, and clutches that transmit torque through the transmission at finite, stepped gear ratios.

A continuously variable transmission is a different type of transmission that can include an infinite number of gear ratios. The arrangement of gears and the like of a continuously variable transmission can improve the fuel efficiency of the vehicle by enabling the power unit to operate at its most efficient revolutions per minute (RPM) for a range of vehicle speeds.

A continuously variable transmission can have multiple operating modes such that each operating mode covers a portion of the overall ratio spread of the transmission. Each operating mode is selectable, e.g., by a clutch that is engaged by the application of hydraulic fluid pressure as commanded by the transmission's control unit. Some continuously variable transmissions have a "geared neutral" mode, in which the continuous variation of ratio passes through the geared neutral mode in transitioning from a reverse ratio to a forward ratio. In the geared neutral position, the vehicle's speed is zero, independently of the rotational output speed by the vehicle's drive unit. Transmissions that have a geared neutral mode may be referred to as infinitely variable transmissions.

Like the continuously variable transmission, an infinitely variable transmission can advantageously improve a vehicle's fuel efficiency, reduce emissions, and provide enhanced control. Infinitely variable transmissions can be included in applications such as tractors, snowmobiles, heavy off-highway construction, mining equipment, and marine applications. However, there are physical limitations with conventional infinitely variable transmissions that restrict some on-highway applications such as buses. Many conventional infinitely variable transmissions have gearing configurations that cause the transmission to be too long, for example, to fit within a space positioned near the rear end of a bus. Infinitely variable transmissions therefore have had limited penetration in the on-highway market.

In addition, an infinitely variable transmission can include a variator assembly for transferring torque therethrough. The variator assembly is designed to rotate in a single direction. In some aspects, an infinitely variable transmission can be coupled to a diesel engine. The output of a diesel engine provides input torque to the transmission by rotating an input shaft, torque converter, or other transmission input device. Diesel engines are known to suddenly kick back, or rotate, in a direction opposite from its normal operating direction during engine shutdown. Since the variator assembly can only rotate in one direction, the sudden kick back can cause mechanical damage to the variator assembly. To avoid this condition and protect the variator assembly, conventional infinitely variable transmissions include a one-way clutch connected to ground. Thus, as the engine begins to turn backwards, the clutch prevents this energy from being transferred to the transmission. Instead, the inertia is returned to the engine.

The problem with the one-way clutch setup is that the inertia returned to the engine can damage or impact the performance of the engine. Also, at start-up, there is concern about potential torsional vibrations affecting the transmission.

Thus, a need exists for a gearing configuration of a variator-inclusive transmission that reduces the overall transmission length and can be operably coupled to a powered vehicle. Further, there is a need to reduce torsional vibrations during start-up and reduce the amount of inertia returned to the engine during shutdown.

SUMMARY

In one exemplary embodiment of the present disclosure, an infinitely variable transmission is provided for a powered vehicle. The transmission includes an input shaft disposed along a first axis and an output shaft spaced from the input shaft and disposed along a second axis. A variator is coupled between the input shaft and output shaft. The variator is disposed along a third axis. The transmission also includes at least two planetary gearsets disposed adjacent to the variator. The planetary gearsets are disposed along a fourth axis. The first, second, third, and fourth axes are parallel to one another and the first axis and the second axis are not coaxial.

In one form of the transmission, the second axis is substantially vertically spaced from the first axis. In another form thereof, the first, second, and third axes are not coaxial. Alternatively, the third axis and the fourth axis are not coaxial. The transmission can also include an input flange for coupling to a drive unit of the vehicle. In one embodiment, the greatest distance between the input flange and the output shaft is less than 1000 millimeters. In another embodiment, the greatest distance is less than about 780 millimeters. Also, the transmission has no more than three clutch assemblies.

In a different embodiment, an infinitely variable transmission having three operating modes includes an input shaft and an output shaft spaced from the input shaft. The infinitely variable transmission further includes a variator coupled between the input shaft and output shaft and a plurality of planetary gearsets disposed adjacent to the variator. The infinitely variable transmission also includes a first clutch assembly, a second clutch assembly, and a third clutch assembly. The first clutch assembly is engageable in a first mode, the second clutch assembly is engageable in a second mode, and the third clutch assembly is engageable in a third mode. In the first mode, the infinitely variable transmission is operable in a reverse, a gear neutral, and a first forward mode. In the second mode, the transmission is operable in a second forward mode. Also, in the third mode, the transmission is operable in a third forward mode.

In a first embodiment, the input shaft is disposed along a first axis and the output shaft is disposed along a second axis. The first axis and the second axis are parallel to one another and not coaxial. In a second embodiment, the variator is disposed along a third axis and the plurality of planetary gearsets is disposed along a fourth axis. In this embodiment, the first, second, third, and fourth axes are parallel to one another. In addition, the third and fourth axes are not coaxial.

In another embodiment, an infinitely variable transmission for a vehicle having a drive unit includes an input shaft and an output shaft spaced from the input shaft. A variator is coupled between the input shaft and output shaft and a plurality of planetary gearsets are disposed adjacent to the variator. Also, the infinitely variable transmission includes an input flange for coupling to the drive unit. The distance between the front edge of the input flange and the rear edge of the output shaft is less than 1000 millimeters. Further, the distance can be less than about 780 millimeters.

In one form of this embodiment, the infinitely variable transmission includes a first clutch assembly, a second clutch assembly, and a third clutch assembly. In another form thereof, the infinitely variable transmission includes a plurality of gearsets coupled between the input shaft and the output shaft. At least two of the plurality of gearsets includes a chain and sprocket assembly.

In a further exemplary embodiment of the present disclosure, an infinitely variable transmission is provided for a powered vehicle in which the powered vehicle includes a power source. The transmission includes an input shaft and an output shaft spaced from the input shaft. A variator is coupled between the input shaft and output shaft. The infinitely variable transmission also includes at least two planetary gearsets disposed adjacent to the variator and an input coupler configured to selectively couple the variator to the power source.

In various aspects of this embodiment, the input coupler may comprise a dry clutch, a damper, a stand alone clutch, a sprag or roller clutch or any combination thereof. In one form of the present disclosure, the input coupler can be coupled to the input shaft. In another form thereof, the input coupler is not coupled to ground. In addition, the variator can include an input and an output such that the input coupler is coupled to the input of the variator.

In a different aspect, the infinitely variable transmission can be configured such that the input shaft is disposed along a first axis, the output shaft is disposed along a second axis, the variator is disposed along a third axis, and the at least two planetary gearsets are disposed along a fourth axis. In this aspect, the first, second, third, and fourth axes are parallel to one another and the first axis and the second axis are not coaxial. The input coupler can be disposed along the first axis or third axis.

In an ancillary embodiment of the present disclosure, a method is provided for selectively transferring energy from a power source to an infinitely variable transmission. The transmission includes an input shaft spaced from an output shaft, a variator coupled between the input shaft and output shaft, at least two planetary gearsets disposed adjacent to the variator, and an input coupler disposed between the power source and variator. The method includes rotating the power source in an input direction and transmitting energy from the power source to the input shaft. The input coupler can be engaged and energy is selectively transferred from the power source to the transmission.

In one aspect of this embodiment, the engaging step comprises engaging a clutch or a damper. Further, the variator is selectively coupled to the power source. In addition, the input shaft can be selectively coupled to the power source.

In a different embodiment, an infinitely variable transmission is powered by a power source of a vehicle. The infinitely variable transmission has three operating modes and can include an input shaft and an output shaft spaced from the input shaft. The infinitely variable transmission further includes a variator coupled between the input shaft and output shaft and an input coupler configured to selectively transfer power from the power source to the variator. In addition, a planetary gearset is disposed adjacent to the variator. The infinitely variable transmission also includes a first clutch assembly, a second clutch assembly, and a third clutch assembly. The first clutch assembly is engageable in a first mode, the second clutch assembly is engageable in a second mode, and the third clutch assembly is engageable in a third mode. In the first mode, the infinitely variable transmission is operable in a reverse, a gear neutral, and a first forward mode. In the second mode, the transmission is operable in a second forward mode. Also, in the third mode, the transmission is operable in a third forward mode.

In the second mode, the transmission is operable in a second forward mode. In the third mode, the transmission is operable in a third forward mode. In one aspect of this embodiment, the input shaft is disposed along a first axis and the output shaft is disposed along a second axis. The first axis and the second axis can be parallel to one another, and in another embodiment the two axes are not coaxial.

The variator can be disposed along a third axis and the planetary gearset can be disposed along a fourth axis. In this embodiment, the first, second, third, and fourth axes can be parallel to one another. In addition, the third and fourth axes are not coaxial.

In a further embodiment, the input coupler is disposed along the first axis or third axis. The input coupler can be a dry clutch, a damper, a stand alone clutch, a sprag or roller clutch or any combination thereof. In addition, the input coupler can be coupled to the input shaft. In another aspect, the variator can include an input and an output such that the input coupler is coupled to the input of the variator.

An advantage associated with one aspect of the present disclosure is the compact packaging of the internal components of an infinitely variable transmission. The transmission can operate with only three clutch assemblies and with an input shaft and output shaft disposed along different axes or centerlines. A variator assembly can also be configured on a different centerline from the input shaft and output shaft. The compact arrangement of internal components can reduce the overall length of the infinitely variable transmission, thereby allowing it to be used in a rear-end bus application.

Another advantage of the present disclosure is the inclusion of the input coupler to the transmission. The input coupler can protect the variator if the power source (e.g., engine) suddenly rotates in reverse during shutdown. During operation, the input coupler can selectively be engaged to transfer power to the variator, or if the power source rotates in reverse, the input coupler can be selectively disengaged. The input coupler can provide a direct coupling between the power source and transmission. In addition, during startup of the vehicle, the input coupler can reduce torsional vibrations and therefore provides for a normal startup similar to manual and automatic transmissions.

An additional advantage associated with one aspect of the present disclosure is the compact packaging of the internal components of an infinitely variable transmission. The transmission can operate with only three clutch assemblies and with an input shaft and output shaft disposed along different axes or centerlines. A variator assembly can also be configured on a different centerline from the input shaft and output shaft. The compact arrangement of internal components can reduce the overall length of the infinitely variable transmission, thereby allowing it to be used in a rear-end bus application.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention. For example, while certain aspects of the disclosure are discussed herein in the context of an infinitely variable transmission, it will be understood by those skilled in the art that aspects of the present disclosure are applicable to other types and configurations of vehicle transmissions.

This disclosure describes several gear schemes that provide multiple operating modes for an infinitely variable transmission. This disclosure also illustrates and describes a number of gearset and clutch arrangements that may be used to implement the illustrated gear schemes. For purposes of the present disclosure, a gearset is used to describe an arrangement of gears and/or chain and sprocket assembly. For example, a gearset may include a pair of meshing gears or at least two gears and a directional idler gear disposed therebetween. Alternatively, a gearset may include a pair of sprockets that are coupled by a chain. In another form thereof, a gearset may include a planetary gearset. A planetary gearset can include a ring gear, a sun gear, and a plurality of pinion gears. One skilled in the art will appreciate other possible definitions of a gearset based on the different embodiments described in this disclosure.

Figure 1A:
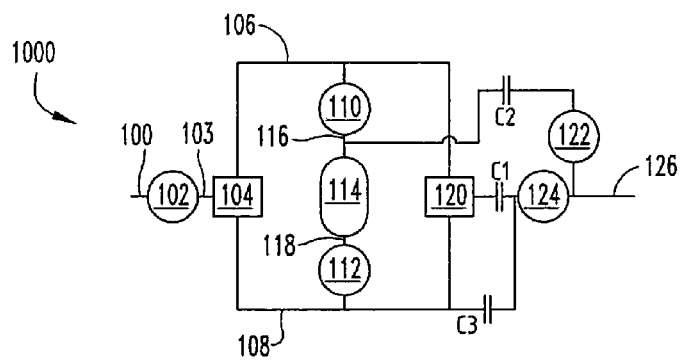
FIG. 1A is a schematic view of a gear configuration for an infinitely variable transmission.
Figure 1B:
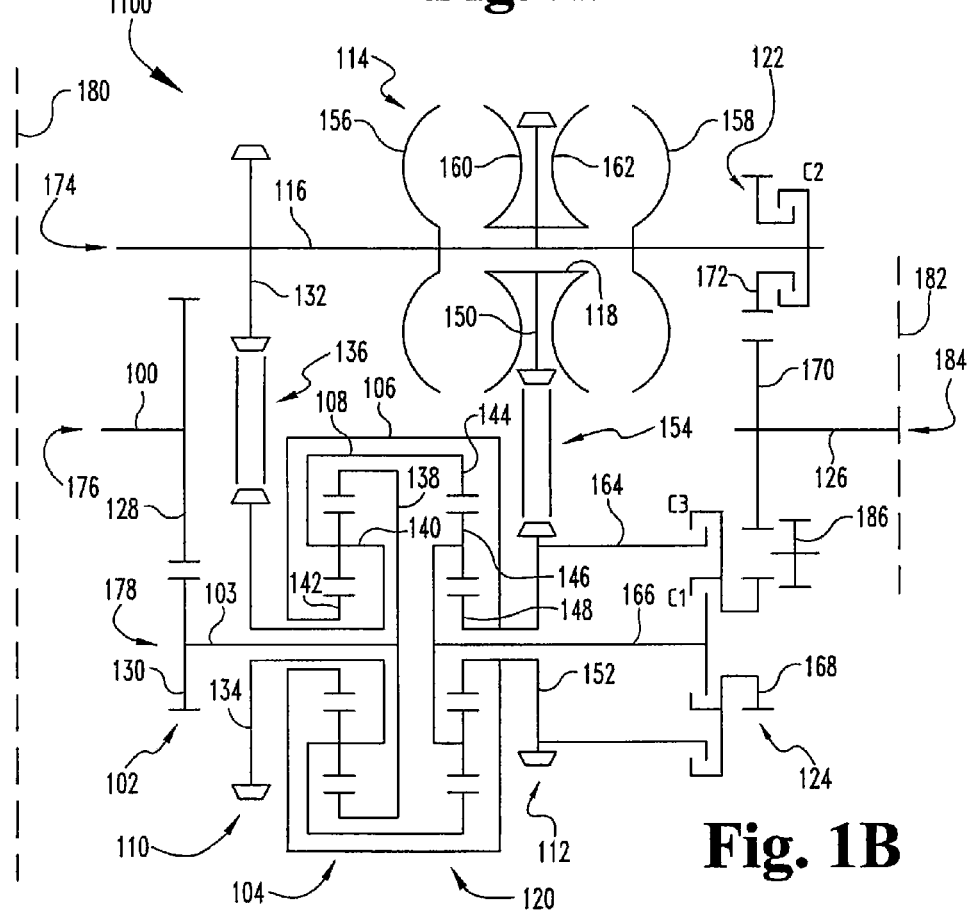
FIG. 1B is a layout diagram of the gear configuration of FIG. 1A.

An exemplary embodiment of a gear configuration 1000 for an infinitely variable transmission is shown in FIG. 1A. The layout 1100 of the gear configuration 1000 is illustrated in FIG. 1B. In this embodiment, the transmission gearing is driven by a rotating input shaft 100, and the output of the transmission is transferred to the vehicle load by a rotating output shaft 126. In FIG. 1B, the input shaft 100 is shown as being on a first axis 176 and the output shaft is disposed on a second axis 184. In one aspect, the first axis 176 and second axis 184 can be parallel and coaxial. In another aspect, however, the first axis 176 and second axis 184 are parallel but not coaxial. For purposes of this disclosure, the term "axis" can also be referred to as a "centerline" and both terms are interchangeable.

A drive unit (not shown) drives the rotation of the input shaft 100. The drive unit can include an internal combustion engine, such as a spark-ignited or compression-ignition type (i.e. diesel) engine, an engine-electric motor combination, or other suitable source of rotational power. The transmission can be coupled to the drive unit by an input flange 180. The input flange 180 is disposed near the front end of the transmission opposite the output shaft 126. The vehicle load can be, for example, the vehicle's drive wheels, an auxiliary gearbox (e.g. a transfer case or drop box), or a power take-off device, such as a pump, mixer, lifter, shoveler, compressor, compactor, or blower, as can be provided with commercial vehicles such as trucks or buses.

The length of the infinitely variable transmission can be measured from the input flange to the output shaft. In FIG. 1B, for example, the length is measured from the front edge of the input flange 180 to the rear edge 182 of the output shaft 126. In a conventional infinitely variable transmission, the length of the transmission is about 39.96 inches (1015 millimeters). In one embodiment of the present invention, the length of the infinitely variable transmission is less than 39 inches (990 millimeters). In another embodiment, the length is less than 35 inches (889 millimeters). In a different embodiment, the length is less than 30.7 inches (780 millimeters). With the input shaft 100 and output shaft 126 being disposed on different axes, the length of the infinitely variable transmission can advantageously be reduced.

In the embodiment of FIG. 1A, the gear configuration 1000 of the infinitely variable transmission includes a plurality of gearsets, a plurality of clutch assemblies, and a variator assembly 114 coupled between the input shaft 100 and output shaft 126. The plurality of gearsets includes input gearsets 102, 110, 112 and output gearsets 122, 124. The plurality of clutch assemblies includes C1, C2, and C3. Input gearsets 110 and 112 can include a pair of gears (with an idler disposed therebetween), for example, or a chain and sprocket assembly. Output gearsets 122 and 124 can also include meshing gears, as will be described in further detail below.

The variator assembly 114 can be a toroidal variator, such as a full toroidal traction drive-type variator manufactured by Torotrak Development, Ltd. of Lancashire, United Kingdom. However, other types of variator assemblies can be used to provide a continuous variation of transmission ratio.

With reference to the embodiment of FIG. 1B, the variator assembly 114 has a pair of input discs 156, 158 and a pair of output discs 160, 162. The input discs 156, 158 are coupled to a variator input shaft 116. The output discs 160, 162 are coupled to a variator output shaft 118. The space between the inner surfaces of the input discs 156, 158 and the inner surfaces of the corresponding output discs 160, 162 form a hollow doughnut shape or 'toroid.' A number of rollers (not shown) are located inside the toroidal space defined by the inner surfaces of the discs 156, 158, 160, 162. The rollers transmit torque from the input discs 156, 158 to the output discs 160, 162 via a traction fluid (not shown).

Variator torque is controlled by a hydraulic circuit (not shown), which includes hydraulic actuators (e.g., pistons and lever assemblies) that apply an adjustable force to the rollers. The force applied by a hydraulic actuator to a roller is balanced by a reaction force resulting from the torques transmitted between the surfaces of the variator discs and the rollers. The end result is that in use, each roller continuously moves to locations and tilt angles required to transmit a torque determined by the force applied by the hydraulic actuators. A difference in the forces applied to the rollers changes the rollers' tilt angle, thereby establishing the variator ratio. A change in the rollers' tilt angle can result not only in a net torque at the transmission output but also in a change in torque direction. The direction of the torque output determines whether the torque application is positive or negative.

In the embodiment of FIGS. 1A and 1B, the infinitely variable transmission can also include a first planetary gearset 104 and a second planetary gearset 120. The first planetary gearset 104 includes a first ring gear 138 (FIG. 1B), a first carrier assembly 140 (FIG. 1B), and a first sun gear 142 (FIG. 1B). Similarly, the second planetary gearset 120 includes a second ring gear 144 (FIG. 1B), a second carrier assembly 146 (FIG. 1B), and a second sun gear 148 (FIG. 1B). As shown in FIG. 1B, the first planetary gearset 104 and second planetary gearset 120 are arranged beside, rather than in front of or behind, the variator assembly 114, thereby shortening the overall length of the transmission.

In FIG. 1B, the variator assembly 114 is positioned on a third axis or centerline 174 and the first planetary gearset 104 and second planetary gearset 120 are positioned on a fourth axis or centerline 178. In this embodiment, the third axis 174 and fourth axis 178 are parallel to one another, but the axes are not coaxial. Further, in one embodiment, the first axis 176, second axis 184, third axis 174, and fourth axis 184 are parallel to one another but not coaxial. In another embodiment, the axes can be parallel and disposed in the same plane. Alternatively, the axes can be parallel to one another but disposed in different planes.

In the gear scheme of FIG. 1A, the infinitely variable transmission can operate in three modes. One of the three clutch assemblies is engaged during each mode. In one embodiment, for example, the C1 clutch assembly is engageable in the first mode. In this mode, the transmission output can rotate in the reverse and forward direction. The transmission can also achieve "gear neutral", meaning there is transmission input speed but approximately zero transmission output speed.

In a second mode, the C2 clutch assembly is engaged and the transmission output can rotate in the forward direction. Similarly, in a third mode, the C3 clutch assembly is engaged and the transmission output can rotate in the forward direction. In each mode, only one clutch assembly is engaged, and therefore during the transition between operating modes one clutch assembly is engaged and another clutch assembly is disengaged.

The engaging and releasing of clutch assemblies results in a synchronous shift. The applying and releasing of clutch assemblies can be achieved electrically, mechanically, hydraulically, or according to other known methods. The shifting between modes can be achieved manually by a vehicle operator, or alternatively completely or partially automated (e.g., by electronic, electro-hydraulic or electro-pneumatic control systems).

Although only clutch assemblies have been described, other torque transmitting mechanisms can be used such as brakes, wet clutches, dry clutches, and dog clutches. In the described embodiments, the clutch assemblies can include rotating clutches. In some embodiments, friction-based torque transmitting mechanisms can be used, while in other embodiments, interference-based torque transmitting mechanisms can be used. The clutch assemblies can include pistons, housings, hubs, housings, seals, o-rings, apply and/or return springs, friction plates, reaction plates, backing plates, or any other component for engaging and disengaging a clutch assembly.

In the illustrated gear scheme of FIGS. 1A and 1B, the infinitely variable transmission can operate in three operating modes. However, a larger or smaller number of operating modes can be provided, and a larger or smaller number of clutch assemblies can be used. For example, if more than three operating modes are desired, more than three clutch assemblies can be used, and if fewer than three operating modes are desired, less than three clutch assemblies can be used. As described above, in FIGS. 1A and 1B, the first operating mode (i.e. mode 1) includes a reverse, geared neutral, and forward operating mode, and the other two modes are forward ranges, but this arrangement is not required.

In the gear configuration 1000 of FIG. 1A, the input shaft 100 of the infinitely variable transmission is driven by the vehicle's drive unit. The input shaft 100 is coupled to a first input gearset 102. The output of the first input gear set 102 can drive a layshaft 103. In turn, the layshaft 103 is coupled to the first planetary gearset 104. The output of one of the components of the planetary gearset 104 is coupled to one side of the variator assembly 114 via a second input gearset 110 and a shaft 116. The output of another component of the planetary gearset 104 is coupled to another side of the variator assembly 114 via a third input gearset 112 and a shaft 118. As shown in FIG. 1A, the shaft 116 can be coupled to the input side of the variator assembly 114 and the shaft 118 can be coupled to the output side of the variator assembly 114. Other arrangements, however, can be incorporated into this design. One such arrangement is achieved by flipping the input side and output side of the variator assembly 114 so that the shaft 116 is coupled to the output side of the variator assembly 114 and the shaft 118 is coupled to the input side of the variator assembly 114.

The second planetary gearset 120 can have a component coupled to one side of the variator assembly 114 via the second input gearset 110 and another component coupled to the other side of the variator assembly 114 via the third input gearset 112. Also, the output of one component of the first planetary gearset 104 can also be coupled to a component of the second planetary gearset 120. As such, the output of one component of the second planetary gearset 120 can be coupled to the C1 clutch assembly and the output shaft 126 via a second output gearset 124.

The gear configuration 1000 of FIG. 1A includes a first output gearset 122 and a second output gearset 124. The clutch assemblies C1 C2, and C3 are selectively engageable to determine the torque output by the output shaft 126. When either of C1 or C3 clutch assemblies is engaged, the second output gearset 124 is employed. When the C2 clutch assembly is engaged, then the first output gearset 122 is employed.

One exemplary layout 1100 of the gear configuration 1000 is illustrated in FIG. 1B. As shown, the input shaft 100, output shaft 126, variator shaft 116, and layshaft 103 are arranged along axes. For example, the input shaft 100 is disposed along axis 176, the output shaft is disposed along axis 184, the variator shaft is disposed along axis 174, and the layshaft is disposed along axis 178. As described above, each of these axes are parallel to one another. Axis 176 and axis 184 can be coaxial, but is not required. Axis 174 and axis 178 are not coaxial such that the variator assembly 114 is positioned adjacent to the first planetary gearset 104 and second planetary gearset 120, both of which are disposed along axis 178. In one embodiment, the axes 174, 176, 178, and 184 are parallel but not coaxial with one another.

The first input gearset 102 can include a pair of meshing gears 128, 130. The first gear 128 can be coupled to the input shaft 100 and the second gear 130 can be coupled to the layshaft 103. Thus, torque can be transferred from the input shaft 100 to the layshaft 103 via the first input gearset 102.

In the illustrated embodiment of FIG. 1B, the second input gearset 110 and third input gearset 112 can each include a gear with an idler or a chain and sprocket assembly. The second input gearset 110, for example, can include a first sprocket 134 and a second sprocket 132. A chain 136 can be coupled between the first sprocket 134 and second sprocket 132 to transfer torque therebetween. Likewise, the third input gearset 112 can include a first sprocket 150, a second sprocket 152, and a chain 154 coupled therebetween. Torque can be transferred between the first sprocket 150 and the second sprocket 152 by the chain 154.

The first output gearset 122 and second output gearset 124 can include meshing gears. For example, the first output gearset 122 can be formed by a first gear 172 and a second gear 170. The second output gearset 124 can be formed by a gear 168 and the second gear 170. The second gear 170 can be coupled to the output shaft 126 so that torque can be transferred to the output shaft 126 via the first output gearset 122 and second output gearset 124. In addition to the output gearsets, an idler gearset 186 can be included in the layout 1100 of FIG. 1B. Although not shown, the idler gearset 186 can be disposed along axes 174 or 176; or, alternatively, the idler gearset 186 can be arranged on a different axis. As shown, the second output gearset 124 includes gears 168, 170, and the idler gearset 186 interposed therebetween.

The first planetary gearset 104 can include a first ring gear 138, a first carrier assembly 140, and a first sun gear 142. The first carrier assembly 140 can include a plurality of pinion gears (identified also as 140 in FIG. 1B) which mesh with the first ring gear 138 and first sun gear 142. Similarly, the second planetary gearset 120 can include a second ring gear 144, a second carrier assembly 146, and a second sun gear 148. The second carrier assembly 146 can include a plurality of pinion gears (identified as 146 in FIG. 1B) which mesh with the second ring gear 144 and second sun gear 148.

Referring again to FIG. 1B, the first ring gear 138 can be coupled or splined to the layshaft 103. As the layshaft 103 rotates, the first ring gear 138 can rotate at about the same speed. In this configuration, the first ring gear 138 is an input component of the first planetary gearset 104 and the first carrier assembly 140 and first sun gear 142 are output components. This is not required, however, as in different embodiments one or more of the components of the first planetary gearset 104 can be input and/or output components. For purposes of this disclosure, the terms "input" and "output" are used to describe the flow of power between two or more components at any given time. Due to the nature of the infinitely variable transmission, the flow of power through two components can vary depending on the operating condition (e.g., mode). For instance, a component can be an input source in one operating mode and an output source in another operating mode.

The first ring gear 138 can be coupled (e.g., meshed or splined) to the pinion gears of the first carrier assembly 140. The first carrier assembly 140 can be an input or output component of the first planetary gearset. As an output component, the carrier assembly 140 transmits torque to the second input gearset 110, e.g., the sprocket 134. In other words, the carrier assembly 140 can drive the sprocket 134, which through the coupling of the chain 136 to the sprocket 132, torque is transmitted through the second input gearset 110 to the variator shaft 116. This is because the sprocket 132 is coupled to the variator shaft 116, which as described above, is coupled to the input side of the variator assembly 114.

The input side of the variator assembly 114 includes a pair of input or end discs 156, 158. Torque can be transferred from the input discs 156, 158 to a pair of output discs 160, 162 of the variator assembly 114 via rollers (not shown) and traction fluid (not shown). The output side of the variator assembly 114, e.g., output discs 160, 162, are coupled to shaft 118. The shaft 118 is coupled (e.g., splined) to the sprocket 150 of the third input gearset 112. The sprocket 150 is an input to sprocket 152 via chain 154. Thus, torque can be transferred from shaft 118 through the third input gearset 112 via sprockets 150, 152 and chain 154.

As shown in FIGS. 1A and 1B, the third input gearset 112 can be coupled to the second output gearset 124 when the C3 clutch assembly is engaged. In particular, the sprocket 152 is coupled (e.g., splined) to shaft 164. Shaft 164 can be a hollow shaft that is also splined to the C3 clutch assembly. When the C3 clutch assembly is engaged, torque can be transferred from the shaft 164 to gear 168 via the C3 clutch assembly and another shaft (not shown). As described above, gear 168 is coupled to gear 170 through an idler gear 186 to form the second output gearset 124. Gear 170 is coupled (e.g., meshes or splined) to output shaft 126 to transfer torque to the vehicle's output load (e.g., drive axis).

The first carrier assembly 140 can also transfer torque to the first sun gear 142. The first sun gear 142 is coupled to the second sun gear 148 of the second planetary gearset 120 via a coupling 106. The coupling 106 can include a housing, hub, shaft, spline, etc. The first sun gear 142 and second sun gear 148 can also be coupled by additional shafts and other components which are not shown in FIG. 1B. In this embodiment, the second sun gear 148 transfers torque to the pinion gears 146. In turn, the second carrier assembly 146 can transmit torque to shaft 166. In the first operating mode, when the C1 clutch assembly is engaged, output torque transmitted by the second carrier assembly 146 can be transferred through the C1 clutch assembly to gear 168 of the second output gearset 124. Since gear 168 couples with gear 170 via idler gear 186, torque is transferred to the output shaft 126.

In addition, the first carrier assembly 140 can transfer torque to the second ring gear 144 through a coupling 108 (e.g., housing, hub, shaft, spline, etc.). The second ring gear 144, which meshes with the pinion gears 146, can therefore transfer torque between the first carrier assembly 140 and second carrier assembly 146. Again, as previously described, when the C1 clutch assembly is engaged, torque can be transmitted from the second carrier assembly 146 to the output shaft 126 via shaft 166 and the second output gearset 124.

To operate in the second operating mode, the C2 clutch assembly is engaged. In FIG. 1B, torque is transferred from the input shaft 100 to the variator shaft 116 via first input gearset 102, layshaft 103, first ring gear 138, first carrier assembly 140, and second input gearset 110. The variator shaft 116 can be coupled or splined to another shaft (not shown) that is coupled to the C2 clutch assembly. When the C2 clutch assembly is engaged, the variator shaft 116 can transfer torque to gear 172 through the C2 clutch assembly. Since gear 172 and gear 170 form the first output gearset 122, torque can be transferred through the first output gearset 122 to the output shaft 126.

Figure 2A:
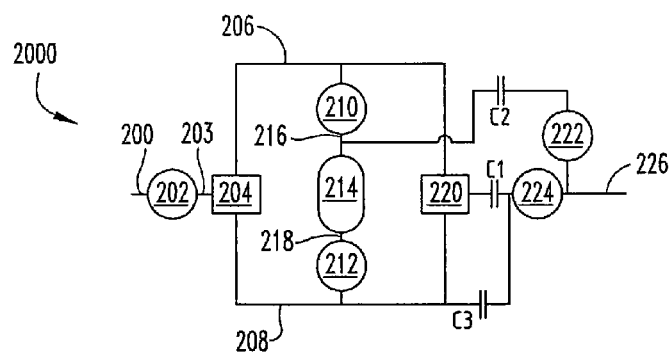
FIG. 2A is a schematic view of a gear configuration for an infinitely variable transmission.
Figure 3A:
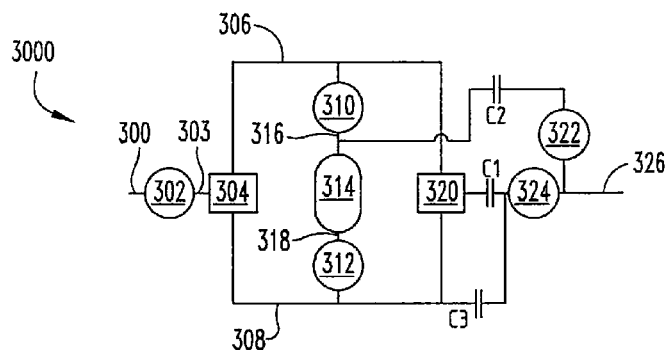
FIG. 3A is a schematic view of a gear configuration for an infinitely variable transmission.
Figure 4A:
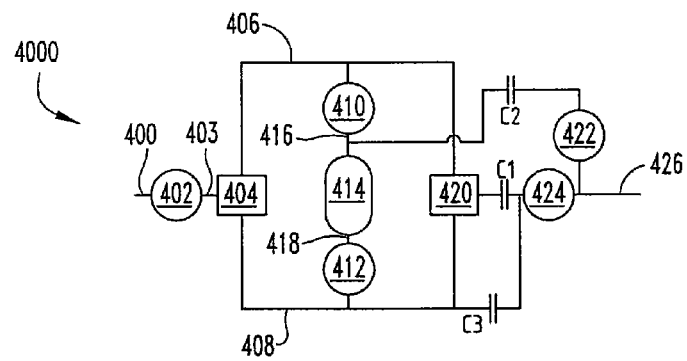
FIG. 4A is a schematic view of a gear configuration for an infinitely variable transmission.

In FIGS. 2A, 3A, and 4A, gear configurations are illustrated for an infinitely variable transmission. These gear configurations are similar to gear configuration 1000 shown in FIG. 1. In these gear configurations, a naming convention is consistently used between FIGS. 1A, 2A, 3A, and 4A. In particular, each component includes a three or four digit reference number, the first digit corresponding to the Figure number and the latter two or three digits referring to the component. For example, the input shaft in FIG. 1B is referred to as 100, and in FIGS. 2A, 3A, and 4A the input shaft is referred to as 200, 300, and 400, respectively. Similarly, the output shaft in FIG. 1B is referred to as 126, and in FIGS. 2A, 3A, and 4A the output shaft is referred to as 226, 326, and 426.

Figure 2B:
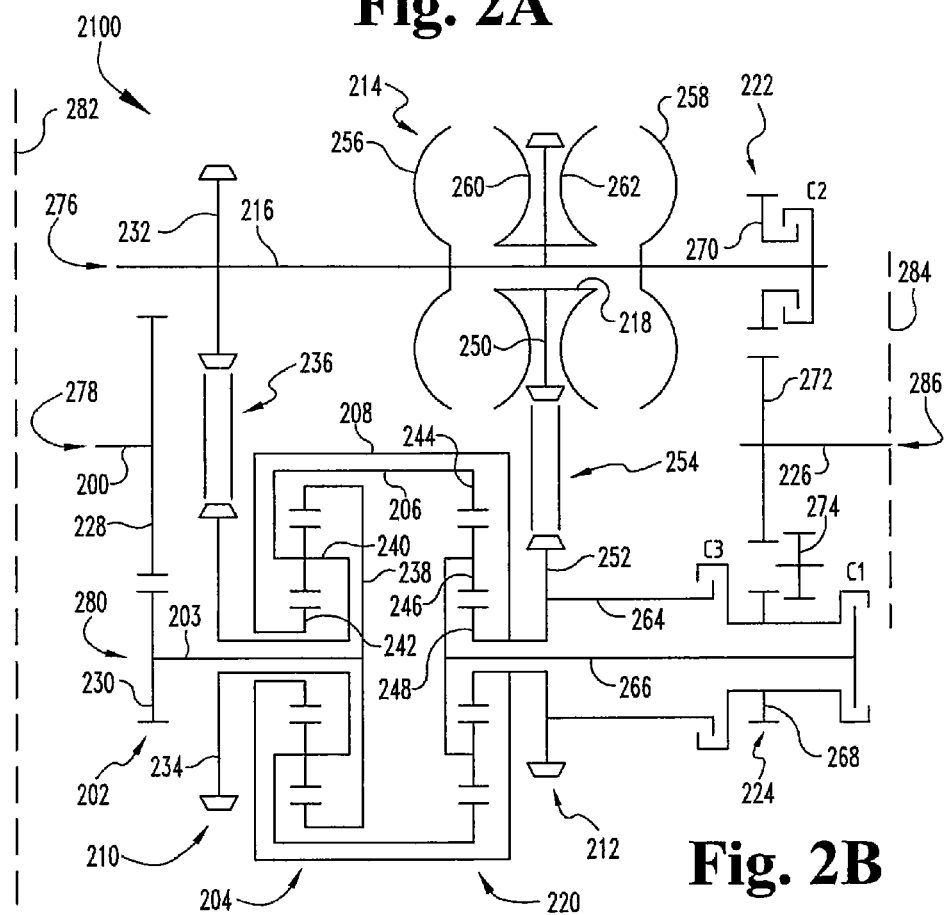
FIG. 2B is a layout diagram of the gear configuration of FIG. 1A.

With reference to the embodiment of FIG. 2B, a layout 2100 of the gear configuration 2000 of FIG. 2A is shown. In the layout 2100, the infinitely variable transmission includes an input shaft 200, output shaft 226, variator shaft 216, and layshaft 203 arranged along axes. For example, the input shaft 200 is disposed along axis 278, the output shaft 226 is disposed along axis 286, the variator shaft 216 is disposed along axis 276, and the layshaft 203 is disposed along axis 280. Each of these axes is parallel to one another. Axis 278 and axis 286 can be coaxial, but is not required. Axis 276 and axis 280 are not coaxial such that the variator assembly 214 is positioned adjacent to the first planetary gearset 204 and second planetary gearset 220, both of which are disposed along axis 280. In one embodiment, the axes 276, 278, 280, and 286 are parallel but not coaxial with one another.

The infinitely variable transmission of FIG. 2B can include three clutch assemblies, i.e., C1, C2, and C3. In an alternative embodiment, the transmission may also include an input clutch assembly (not shown). As described above, the infinitely variable transmission can operate in three operating modes. In the first operating mode, e.g., mode 1, the C1 clutch assembly is engaged and the transmission can achieve reverse, gear neutral, or a first forward range. In the second operating mode, e.g., mode 2, the C2 clutch assembly is engaged and the transmission can operate in a second forward range. In the second forward range, the transmission output shaft 226 can rotate faster than in the first forward range. Thus, the vehicle is able to achieve a greater vehicle speed. In the third operating mode, e.g., mode 3, the C3 clutch assembly is engaged and the transmission can operate in a third forward range. In the third forward range, the transmission output shaft 226 can rotate faster than in the first and second forward ranges.

The layout 2100 of FIG. 2B is substantially the same as the layout 1100 of FIG. 1B, except for the location of the C1 clutch assembly relative to the C3 clutch assembly. In FIG. 2B, the C1 clutch assembly is positioned behind the C3 clutch assembly. The torque paths through the infinitely variable transmission, however, are still substantially the same as in the layout 1100 of FIG. 1B.

In mode 1, for example, the C1 clutch assembly is engaged. To operate in this mode, torque passes through the input shaft 200 and layshaft 203 via the first input gearset 202. In particular, the input shaft 200 can be coupled to a vehicle's drive unit and transmit torque to the first input gearset 202. The first input gearset can include a first gear 228 and a second gear 230 that mesh with one another. The second gear 230 is concentrically coupled or splined to the layshaft 203. Similarly, the first gear 228 can be concentrically coupled or splined to the input shaft 200.

A first ring gear 238 of a first planetary gearset 204 can be coupled or splined to the layshaft 203 and thereby transfer torque to a first carrier assembly 240. Similar to the first carrier assembly 140 of FIG. 1B, the first carrier assembly 240 can transfer torque to a second ring gear 244 of a second planetary gearset 220. The first carrier assembly 240 can be coupled or splined via a shaft 206 or other coupling to the second ring gear 244. The second ring gear 244 is input to the second planetary gearset 220 and torque passes therethrough to a second carrier assembly 246. In turn, the second carrier assembly 246 is coupled to the C1 clutch assembly via a shaft 266 or other coupling. When the C1 clutch assembly is engaged, torque passes to a gear 268 of a second output gearset 224. The second output gearset 224 includes gears 268, 272 and an idler gearset 274 interposed therebetween. Gear 272 is concentric with the output shaft 226 and therefore output torque is transferred to the output shaft 226 to power a vehicle's load (e.g., drive axis).

In mode 2, the C2 clutch assembly is engaged. As such, torque is transferred through the input shaft 200, first input gearset 202, and first ring gear 238 to the first carrier assembly 240. The first carrier assembly 240 can be coupled to a second input gearset 210. Similar to the first input gearset 110 of FIG. 1B, the first input gearset 210 of FIG. 2B includes a chain and sprocket assembly. An input sprocket 234 is coupled to the first carrier assembly 240 and torque is transferred through chain 236 to output sprocket 232. Output sprocket 232 is coupled or splined to the variator shaft 216. The variator shaft 216 can be coupled or splined with one or more shafts (not shown) so that torque is transferred from the variator shaft to the C2 clutch assembly. As shown in FIG. 2A, when the C2 clutch assembly is engaged, the variator shaft 216 is coupled to a first output gearset 222. The first output gearset can include two meshing gears 270, 272. Gear 272 can be coupled or splined with the output shaft 226, and therefore torque can be transferred from the variator shaft 216 to the output shaft 226 via the C2 clutch assembly and the first output gearset 222.

In the third operating mode, e.g., mode 3, the C3 clutch assembly is engaged. In this mode, torque can be transferred along three different paths. First, the first carrier assembly 240 is coupled (e.g., splined or meshes) to the first sun gear 242. As shown in FIG. 2A, when the C3 clutch assembly is engaged, torque can pass from the first planetary gearset 204 to the second output gearset 224 via a coupling 208 (e.g., housing, hub, shaft, spline, etc.). As described above, the second output gearset 224 includes gears 268, 272 (with the idler gear 274 interposed therebetween) and gear 272 is coupled or splined to the output shaft 226.

Second, the first carrier assembly 240 is also coupled to the second ring gear 244 of the second planetary gearset 220. The second ring gear 244 can transfer torque to the second carrier assembly 246, which in turn can transfer torque to a second sun gear 248. When the C3 clutch assembly is engaged, the second sun gear 248 can transfer torque to the second output gearset 224 via a shaft 264 or other coupling. The second output gearset 224 is coupled or splined to the output shaft 226 to provide torque to the vehicle's output load.

In a third path, the first carrier assembly 240 can transfer torque to the variator shaft 216 via the second input gearset 210 (e.g., chain and sprocket assembly). The input side of the variator assembly 214 is coupled or splined to the variator shaft 216. In particular, input discs 256, 258 (or end discs) are coupled to the input side of the variator assembly 214 and output discs 260, 262 (or center discs) are coupled to the output side thereof. A plurality of rollers and traction fluid assist with transferring torque from the input discs 256, 258 to the output discs 260, 262.

The output discs 260, 262 of the variator assembly 214 are coupled or splined to a shaft 218, which is coupled or splined with a third input gearset 212. In FIG. 2B, the third input gearset 212 can include a chain and sprocket assembly. For example, torque transmitted to the shaft 218 can be further transferred from an input sprocket 250 to an output sprocket 252 via chain 254. The output sprocket 252 can transfer torque to the second output gearset 224 when the C3 clutch assembly is engaged. In particular, the output sprocket 252 can be coupled to the gear 268 via the shaft 264 or other coupling. As torque is transferred to the second output gearset 224, the output shaft 226 can further transmit the torque to the vehicle's output load.

Referring to FIG. 2B, the length of the infinitely variable transmission can be measured from the front end of an input flange 282 to the rear edge of an output shaft 226. The input flange 282 can be coupled to the vehicle's drive unit (e.g., engine). As described above, with the different shafts being positioned on parallel, but non-coaxial axes or centerlines, the overall length of the transmission can be reduced. In this compact configuration, the infinitely variable transmission can advantageously be incorporated into a rear-end bus application.

Figure 3B:
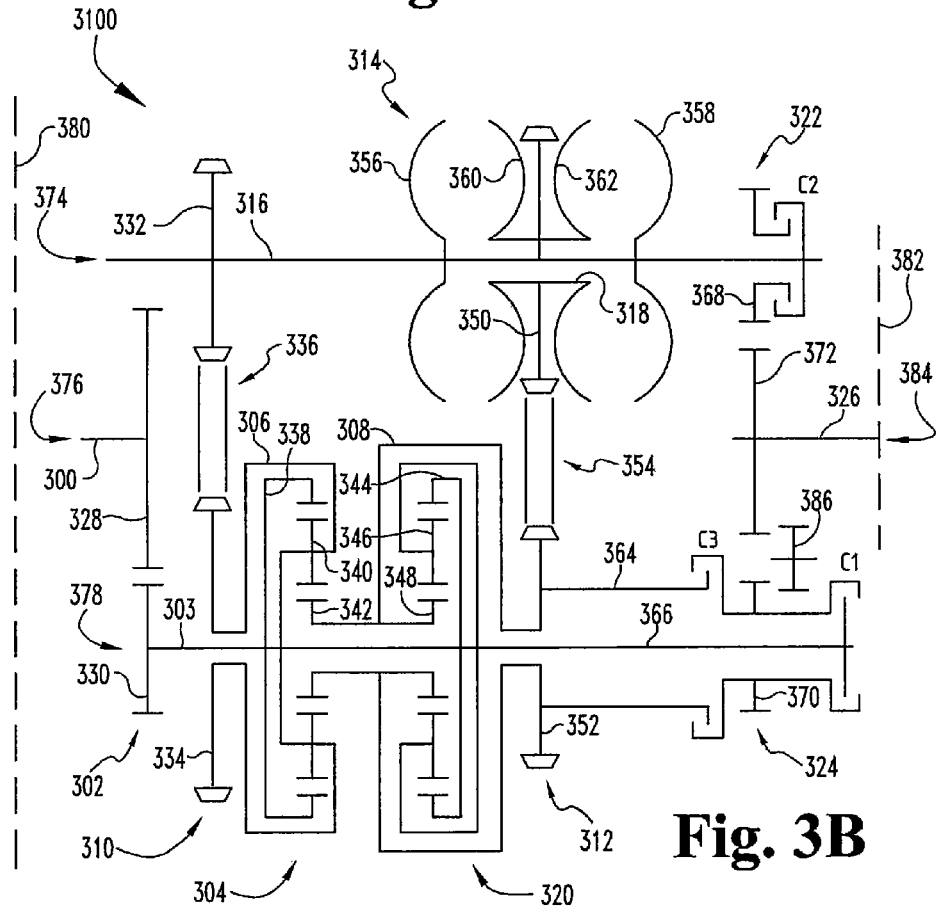
FIG. 3B is a layout diagram of the gear configuration of FIG. 1A.

A different layout 3100 of the gear configuration 3000 is shown in FIG. 3B. In the layout 3100, the infinitely variable transmission has three clutch assemblies, i.e., C1, C2, and C3, each of which is engaged in mode 1, mode 2, and mode 3, respectively. Similar to the layout 2100 of FIG. 2B, in the layout 3100 of FIG. 3B the C1 clutch assembly is positioned behind or closer to the rear of the transmission than the C3 clutch assembly. As described above, the gear configuration 3000 shown in FIG. 3A is similar to the gear configurations 1000, 2000 of FIGS. 1A and 2A, respectively.

In the layout of FIG. 3B, an input shaft 300 is coupled to a layshaft 303 via a first input gearset 302. The first input gearset 302 includes two meshing gears 328, 330. The layshaft 303 can be coupled to different components of a first planetary gearset 304 and a second planetary gearset 320. As shown, for example, the layshaft 303 can be coupled to a first ring gear 338 and first carrier assembly 340 of the first planetary gearset 304 and a second ring gear 344 and second carrier assembly 346 of the second planetary gearset 320. Torque can be transferred from the first ring gear 338 to the first carrier assembly 340 and from the second ring gear 344 to the second carrier assembly 346. Also, the first carrier assembly 340 can transfer torque to a first sun gear 342 or a second input gearset 310 via a coupling 306 (e.g., housing, hub, shaft, spline, etc.). On the other hand, the second carrier assembly 346 can transfer torque to a second sun gear 348.

The second input gearset 310 and a third input gearset 312 include chain and sprocket assemblies. In the second input gearset 310, for example, torque is received by an input sprocket 334 and transferred to an output sprocket 332 via a chain 336. Likewise, in the third input gearset 312, torque is received by an input sprocket 350 and transferred to an output sprocket 352 via a chain 354.

In the illustrated layout 3100, a variator assembly 314 is positioned adjacent to the first planetary assembly 304 and the second planetary assembly 320. The variator assembly 314 can include an input side and an output side. The input side includes a pair of input discs 356, 358 (e.g., end discs) and the output side includes a pair of output discs 360, 362 (e.g., center discs). A plurality of rollers (not shown) and traction fluid (not shown) transfer torque from the input discs 356, 358 to the output discs 360, 362. The input discs 356, 358 can be coupled to a variator shaft 316, whereas the output discs 360, 362 can be coupled to a different shaft 318. As shown, the second input gearset 310 is coupled to the variator shaft 316 and the third input gearset 312 is coupled to the other shaft 318.

This embodiment also includes a first output gearset 322 and a second output gearset 324. The first output gearset 322 includes a pair of meshing gears 368, 372 and the second output gearset 324 includes a pair of gears 370, 372 with an idler gear 386 being interposed therebetween.

As described above, the infinitely variable transmission can operate in three modes. In a first mode, the C1 clutch assembly is engaged. Torque can be transferred from the second carrier assembly 346, for example, to the second output gearset 324 via shaft 366 and/or other couplings when the C1 clutch assembly is engaged. The gear 370 can be coupled to the second carrier assembly 346 when the C1 clutch assembly is engaged, and torque thereby can be transferred to the output shaft 326 via gear 372.

Also, or alternatively, torque can be transferred from the first ring gear 338 to gear 370 via first carrier assembly 340. Torque can also be transferred from the input shaft 300 to the second output gearset 324 via the first planetary gearset 304 and second planetary gearset 320. In this embodiment, torque is transferred through the first ring gear 338, the first carrier assembly 340, the first sun gear 342, the second sun gear 348, and the second carrier assembly 346. Torque can also be transferred from the second sun gear 348 to the second ring gear 344 via the second carrier assembly 346.

In mode 2, the C2 clutch assembly is engaged. Torque can be transferred through the chain and sprocket assembly of the second input gearset 310. Torque can further be transferred from the second sprocket 332 to the variator shaft 316. When the C2 clutch assembly is engaged, torque can be transferred to the first output gearset 322 via gear 368. Since gear 368 meshes with gear 372, which is coupled or splined to the output shaft 326, torque can be transferred to the output shaft 326 of the transmission.

In mode 3, the C3 clutch assembly is engaged. Torque can be transferred through the variator assembly 314 and to shaft 318. Since shaft 318 is coupled or splined with sprocket 350 of the third input gearset 312, torque can be transferred through to shaft 364 or other coupling via sprockets 350, 352 and chain 354. When the C3 clutch assembly is engaged, torque can be transferred to gear 370 of the second output gearset 324. The idler gear 386 can transfer from torque from gear 370 to gear 372, and thus torque can be transferred to the output shaft 326 of the transmission.

In addition, when the C3 clutch assembly is engaged, torque can also be transferred from the first sun gear 342 to gear 370 via a coupling 308 (e.g., housing, hub, shaft, spline, etc.) and/or several shafts (e.g., shaft 364) or other couplings. As described above, with the gear 370 coupled to the gear 372 via idler gear 386, torque can be transferred to the output shaft 326 of the transmission. There can be other torque paths (e.g., via the second planetary gearset 320) in the layout 3100 of FIG. 3B such that, when the C3 clutch assembly is engaged, torque can be transmitted to the vehicle's output load.

As shown in FIG. 3B, the input shaft 300 and output shaft 326 are positioned on different axes. The input shaft 300 is disposed along axis 376 and the output shaft 326 is disposed along axis 384. Axis 376 can be parallel to and coaxial with axis 384, but this is not required. For example, axis 376 can be parallel but non-coaxial with axis 384. In another embodiment, axis 376 and axis 384 can be non-parallel to one another.

The variator shaft 316 can be disposed along axis 374 and the layshaft 303 can be positioned along axis 378. Axes 374 and 378 can be parallel to one another, but in order to reduce the length of the infinitely variable transmission, the two axes are non-coaxial. As such, the variator assembly 314, which is positioned on axis 374, is positioned adjacent to the planetary gearsets 304, 320, which are disposed along axis 378. In other words, a more compact packaging size can be achieved by positioning the variator assembly 314 on a different axis than the planetary gearsets. As shown in FIG. 3B, two of the three clutch assemblies (C1 and C3) can be positioned along axis 378 with the planetary gearsets, and the other clutch assembly (C2) can be positioned along axis 374 with the variator assembly 314. In this layout, the variator shaft 316 and its corresponding axis 374 and the layshaft 303 and its corresponding axis 378 form countershafts to the output shaft 326 and its corresponding axis 384.

The illustrated embodiment of FIG. 3B, like the previously described embodiments, is advantageous over the gear configurations and packaging of conventional infinitely variable transmissions due to the four different axes (e.g., 374, 376, 378, and 384) upon which components can be positioned. The overall length of the infinitely variable transmission, which can be measured from the front edge of an input flange 380 to the rear-most edge of the output shaft 326 in FIG. 3B, can therefore be reduced.

Figure 4B:
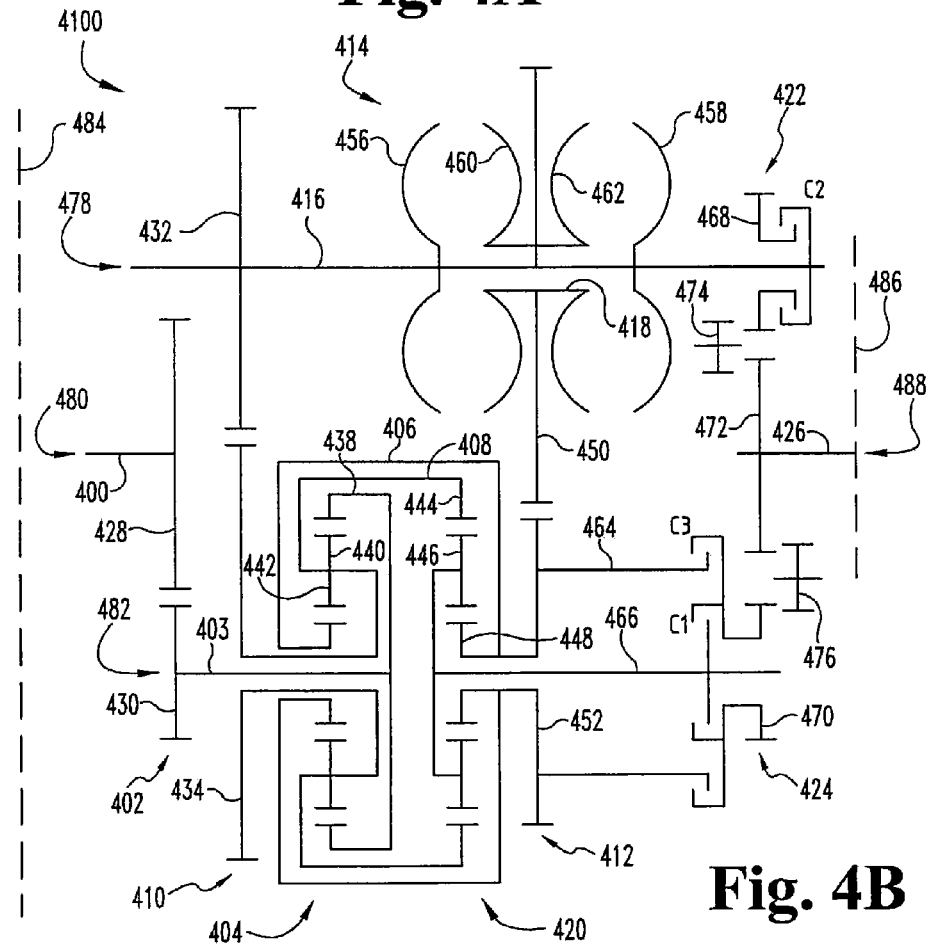
FIG. 4B is a layout diagram of the gear configuration of FIG. 1A.

With reference to FIG. 4B, a different embodiment of a gearing layout 4100 is illustrated. The layout 4100 is similar to the layout 1100 of FIG. 1B, except for a second idler gear and a different gearing scheme for two of the three input gearsets. In one aspect, the gearing layout 4100 can also include an input clutch assembly (not shown) in addition to the three clutch assemblies, i.e., C1, C2, and C3. The infinitely variable transmission includes four different axes or centerlines. An input shaft 400 is positioned on a first axis 480 and an output shaft 426 is positioned on a second axis 488. The first axis 480 and second axis 488 can be parallel to one another. In one embodiment, the two axes 480, 488 are parallel and coaxial with one another, but in an alternative embodiment the two axes 480, 488 are parallel and non-coaxial with one another.

A third axis 478 can include a variator assembly 414, variator shaft 416, and one of the three clutch assemblies (i.e., the C2 clutch assembly). A fourth axis 482 can include a layshaft 403, a pair of planetary gearsets 404, 420, and the other two clutch assemblies (i.e., the C1 clutch assembly and the C3 clutch assembly). The third axis 478 and fourth axis 482 can be parallel to one another, but the two axes are not coaxial. In this arrangement, the variator assembly 414 can be positioned adjacent to the planetary gearsets, not on a different axis or centerline, so that the overall length of the infinitely variable transmission is less than conventional infinitely variable transmissions. In one embodiment, the first axis 480, second axis 488, third axis 478, and fourth axis 482 can be parallel to one another, but no two axes are coaxial. In another embodiment, at least two of the four axes can be coaxial. Similar to the previously described embodiments, the overall length of the infinitely variable transmission can be measured from the front edge of an input flange 484 (defined by the dashed line) to the rear-most edge of the output shaft 426.

As described above, the layout 4100 of FIG. 4B is similar to the layout 1100 of FIG. 1B. The input shaft 400 can be coupled to a first input gearset 402, which is formed of two meshing gears 428, 430. Gear 428 can be coupled or splined to the input shaft 400 such that the input shaft 400 and gear 428 are concentric with one another. Likewise, gear 430 can be coupled or splined to the layshaft 403 such that the layshaft 403 and gear 430 are concentric with one another.

The layshaft 403 can be coupled to a first planetary gearset 404, in particular, to a first ring gear 438 of the first planetary gearset 404. As the layshaft 403 rotates about its axis 482, the first ring gear 438 can rotate at substantially the same speed. The first ring gear 438 meshes with pinion gears of a first carrier assembly 440, and the pinion gears further mesh with a first sun gear 442. The first carrier assembly 440 and first sun gear 442 can transfer output torque to various components including a second output gearset 410 and a second planetary gearset 420. For example, the first carrier assembly 440 can transfer torque to a second ring gear 444 of the second planetary gearset 420 via a coupling 408 (e.g., housing, hub, shaft, spline, etc.). Like the first ring gear 438, the second ring gear 444 meshes with pinion gears of a second carrier assembly 446. The pinion gears of the second carrier assembly 446 also mesh with a second sun gear 448.

The first carrier assembly 440 can also couple to the second input gearset 410 via a shaft or other coupling. Unlike the second input gearset 110 of FIG. 1B, the second input gearset 410 of FIG. 4B does not include a chain and sprocket assembly. Instead, the second input gearset 410 comprises two meshing gears 432, 434. Torque can be transferred from the first carrier assembly 440 to gear 432 via gear 434. Gear 432 can be coupled or splined to the variator shaft 416, so torque transferred to gear 432 is in turn transferred to the variator shaft 416.

The variator shaft 416 is coupled to an input side of the variator assembly 414. The input side of the variator assembly 414 includes a pair of input discs 456, 458, also referred to as end discs. The input discs 456, 458 can transfer torque to a pair of output discs 460, 462 (i.e., center discs) via a plurality of rollers (not shown) and traction fluid (not shown). The output discs 460, 462 can be coupled to a shaft 418 and transfer torque to the third input gearset 412. Like the second input gearset 410, the third input gearset 412 includes a pair of meshing gears 450, 452. Gear 450 transfers torque to gear 452, which is coupled or splined to the C3 clutch assembly via shaft 464 or other coupling.

In the layout of FIG. 4B, there are two output gearsets 422, 424. The first output gearset 422 includes a pair of gears 468, 472 coupled together via a first idler gearset 474 interposed therebetween. Gear 468 can be coupled or splined to one or more shafts including the variator shaft 416 along the axis 478. Gear 472 can be coupled or splined to the output shaft 426 such that torque can be transferred through the first output gearset 422 to the output shaft 426. The second output gearset 424 also includes two gears 470, 472 coupled to one another via a second idler gearset 476 interposed therebetween. Since the gear 472 is coupled or splined to the output shaft 426, torque can be transferred from the gear 470 to the output shaft 426 via gear 472 and idler gear 476.

In modes 1, 2, and 3, torque is transferred from the input shaft 400 to the output shaft 426 along similar paths as described above with reference to FIG. 1B. In particular, in mode 1 when the C1 clutch assembly is engaged, torque can be transferred from the input shaft 400 to the output shaft 426 via the first input gearset 402, layshaft 403, first ring gear 438, first carrier assembly 440, coupling 408, second ring gear 444, second carrier assembly 446, shaft 466, C1 clutch assembly, and second output gearset 424. In mode 2, when the C2 clutch assembly is engaged, torque can be transferred from the input shaft 400 to the output shaft 426 via the first input gearset 402, the layshaft 403, the first ring gear 438, the first carrier assembly 440, the second input gearset 410, the variator shaft 416, the C2 clutch assembly, and the first output gearset 422.

In the third operating mode, i.e., when the C3 clutch assembly is engaged, torque can be transferred through several torque paths from the input shaft 400 to the output shaft 426. First, torque can be transferred from the input shaft 400 to the output shaft 426 via the first input gearset 402, the layshaft 403, the first ring gear 438, the first carrier assembly 440, the second input gearset 410, the variator shaft 416, the variator assembly 414, shaft 418, the third input gearset 412, the shaft 464, the C3 clutch assembly, and the second output gearset 424. Also, torque can be transferred from the input shaft 400 to the output shaft 426 via the first input gearset 402, the layshaft 403, the first ring gear 438, the first carrier assembly 440, the first sun gear 442, the coupling 406 (e.g., housing, hub, shaft, spline, etc.), shaft 464, the C3 clutch assembly, and the second output gearset 424. Torque can further be transferred through the first carrier assembly 440, the coupling 408 (e.g., housing, hub, shaft, spline, etc.), the second ring gear 444, the second carrier assembly 446, the second sun gear 448, shaft 464, the C3 clutch assembly, and the second output gearset 424.

In FIGS. 1A, 2A, 3A, and 4A, gear configurations or schemes are shown for a three-mode infinitely variable transmission described above. In each of these gear schemes, a double shunt architecture is used for the first operating mode. In other words, the variator assembly 114 (FIG. 1A) is not directly coupled to either the first planetary assembly 104 or the second planetary assembly 120. Instead, there are two shunt paths and the gear neutral mode can be achieved since the second planetary 120 is coupled to the output shaft 126.

Also, in each of these gear schemes, an output coupled shunt is achieved in the second and third operating modes. In the output coupled shunt, a split power pass is achieved because the first ring gear 138, first carrier assembly 140, and first sun gear 142 are rotating at different speeds with different torque ratios (FIG. 1A). As such, at least a portion of the torque passing through the infinitely variable transmission passes through the variator assembly 114.

Figure 5:
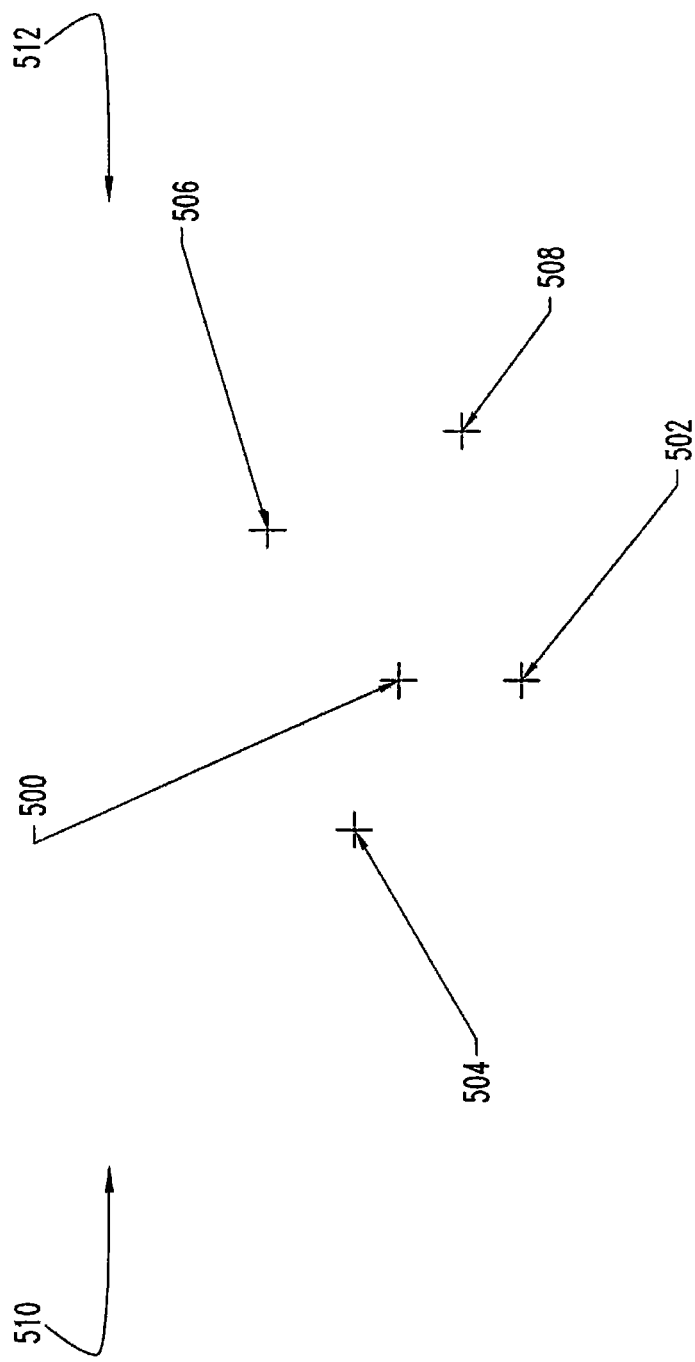
FIG. 5 is a front view of a plurality of axes for a gearing arrangement of the transmission of FIG. 1A.
Figure 6:
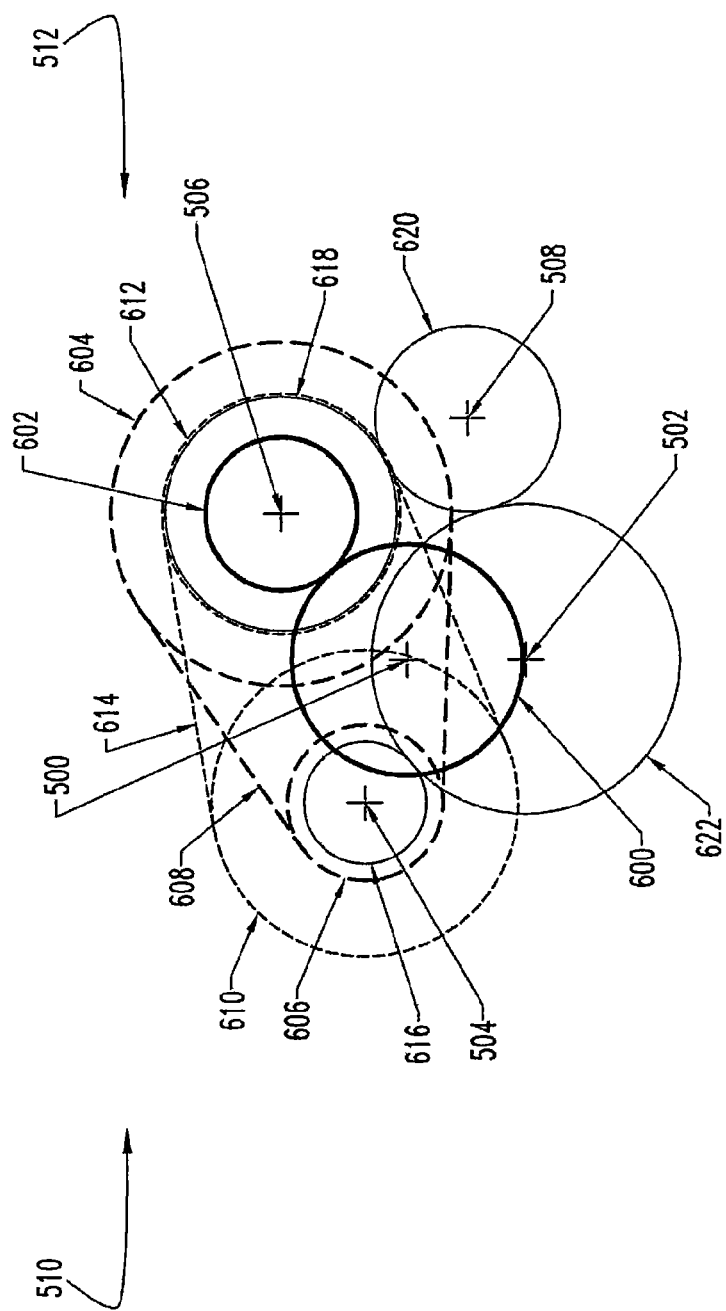
FIG. 6 is a schematic front view of a gearing arrangement of FIG. 5.

With reference to the embodiments of FIGS. 5 and 6, a front view of a gearing configuration for an infinitely variable transmission is shown. In FIG. 5, for example, the packaging of the internal components can be positioned along at least four different axes or centerlines. In this embodiment, an input shaft can be positioned along a first axis 500 or centerline. An output shaft can be positioned along a second axis 502 or centerline. As shown, the first axis 500 and second axis 502 are parallel to one another, but the two axes are not coaxial. Instead, the second axis 502 is vertically spaced from the first axis 500. In a different embodiment, the first axis 500 and second axis 502 can be parallel and coaxial.

A variator can be positioned on a third axis 504 or centerline. The third axis 504, upon which one of three clutch assemblies can be positioned, is parallel to the first axis 500 and second axis 502. However, the third axis 504 is spaced from the two axes 500, 502 and is positioned near the passenger side 510 of the vehicle. As such, for a substantially vertical plane passing through the first axis 500 and the second axis 502, the third axis 504 is positioned outside the plane.

A pair of planetary gearsets and two clutch assemblies can be disposed along a fourth axis 506 or centerline. A layshaft can also be positioned along the fourth axis 506. The fourth axis 506 can be parallel to the first axis 500, the second axis 502, and the third axis 504. As shown, however, the fourth axis 506 is not coaxial with the other three axes. Instead, the fourth axis 506 is positioned near the driver side 512 of the vehicle. In this arrangement, the variator and planetary gearsets are adjacent to one another, but are not on the same axis or centerline. As described above, this enables the internal components of the infinitely variable transmission to be more compactly packaged and thereby reduces the overall length of the transmission.

As also shown in FIG. 5, an idler gearset can be positioned along a fifth axis 508 or centerline. The fifth axis 508 can be parallel to the other axes, but as shown, the fifth axis 508 is not coaxial with these other axes. In an alternative embodiment, the first axis 508 can be coaxial with the first axis 500 and third axis 504.

Referring to FIG. 6, the different components are shown positioned along each corresponding axis. For example, in FIG. 1B, the first input gearset 102 includes two meshing gears 128, 130. Gear 128, which corresponds to gear 600 in FIG. 6, is positioned along the first axis 500 (i.e., axis 176 of FIG. 1B). Gear 130, which corresponds to gear 602 in FIG. 6, is positioned along the fourth axis 506 (i.e., axis 178 of FIG. 1B). Also, the second input gearset 110 of FIG. 1B includes a first sprocket 134 coupled to a second sprocket 132 via a chain 136. In FIG. 6, the first sprocket 134 is identified as 604 and the second sprocket is identified as 606. The first sprocket 604 is coupled to the second sprocket 606 by a chain 608.

As shown, the second sprocket 606 is positioned along the variator shaft, i.e., the third axis 504 (i.e., axis 174 of FIG. 1B). As described above, torque can be transferred from the variator to a third input gearset (i.e., gearset 112 of FIG. 1B). The third input gearset includes a first sprocket 610 coupled to a second sprocket 612 via a chain 614. The second sprocket 612, which corresponds to sprocket 152 of FIG. 1B, is positioned along the fourth axis 506 or centerline.

As illustrated in FIG. 1B, there can be two output gearsets 122, 124. The first output gearset 122 includes a pair of meshing gears (e.g., gears 170, 172) and the second output gearset 124 includes a pair of gears 168, 170 with an idler gear 186 interposed therebetween. Output gear 170, which is included in both output gearsets, can be coupled or splined to the output shaft and thus is concentric or disposed along the second axis 502 (i.e., axis 184 of FIG. 1B). In FIG. 6, the output gear 170 is identified as output gear 622. Gear 172 of the first output gearset 122 is disposed along the same axis or centerline as the variator, i.e., the third axis 504. This gear is identified as input gear 616. Gear 168 of the second output gearset is positioned along the same axis or centerline as the layshaft 103 (as shown in FIG. 1B), which is the fourth axis 506 shown in FIG. 6. This gear 168 is identified as an input gear 618 in FIG. 6. As also shown in FIG. 6, an idler gear 620 (identified as idler gear 186 in FIG. 1B) is disposed along the fifth axis 508 or centerline and meshes or splines with the input gear 618 and output gear 622.

In other embodiments, there can be additional axes or centerlines. Components can be arranged differently and positioned on different axes or centerlines. There can also be additional or fewer components depending on the application and intended use. For instance, any one of the above-described embodiments can include an input clutch assembly.

Figure 7A:
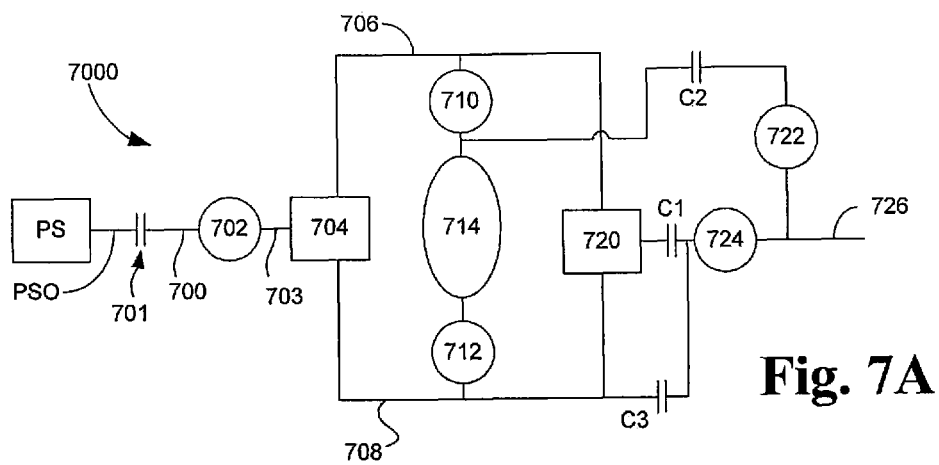
FIG. 7A is a schematic view of a gear configuration including an input coupler for an infinitely variable transmission.
Figure 7B:
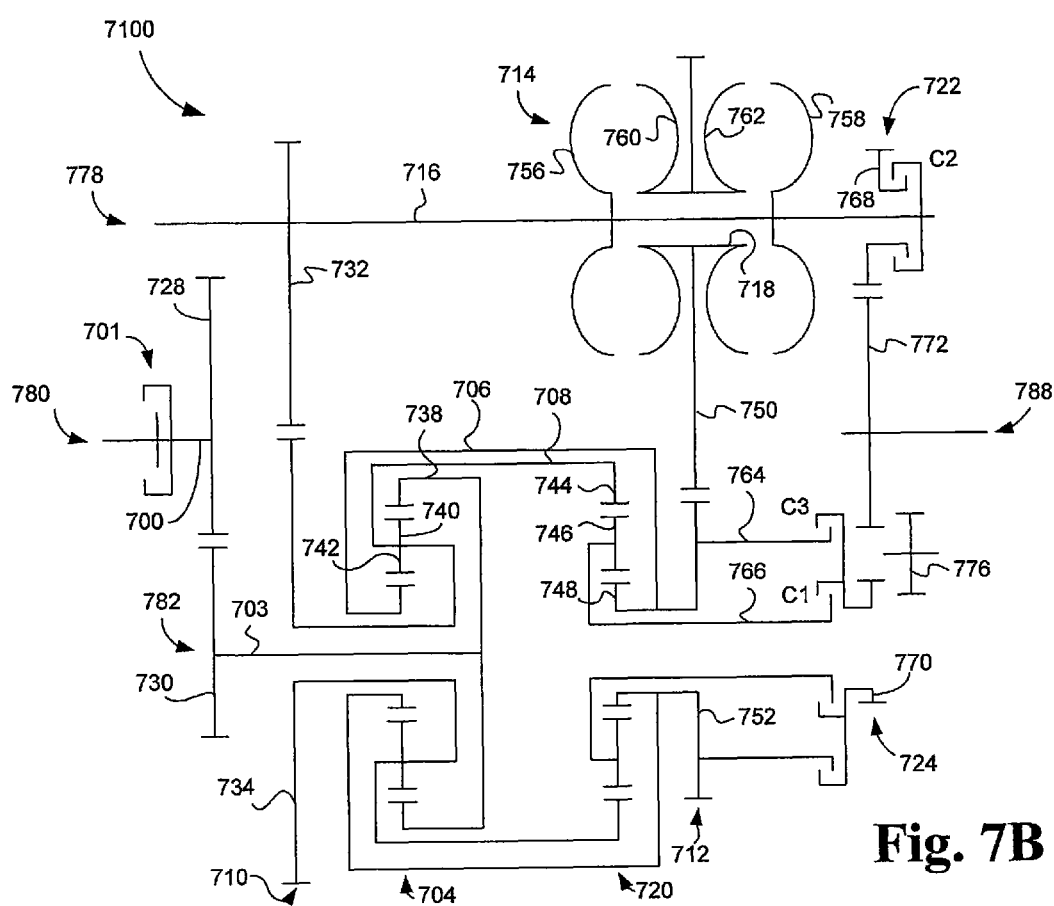
FIG. 7B is a layout diagram of the gear configuration of FIG. 7A.

A different embodiment of a gear configuration and corresponding layout of an infinitely variable transmission is illustrated in FIGS. 7A and 7B, respectively. The layout 7100 is similar to the gearing layout 4100 of FIG. 4B, except for the inclusion of an input coupler 701 in the embodiment of FIGS. 7A and 7B. The input coupler 701 can be a standard clutch assembly similar to the three clutch assemblies, C1, C2, and C3. The input coupler can be a dry clutch assembly, a damper assembly, a stand alone clutch assembly (e.g., a rotating clutch assembly), a sprag or roller clutch assembly or any combination thereof. As shown in FIG. 7B, the input coupler can be disposed along an input centerline or axis 780 and be coupled to an input shaft 700.

Similar to the illustrated embodiment of FIG. 4B, the layout 7100 of the infinitely variable transmission can include four different axes or centerlines. The input coupler 701 and input shaft 700 is positioned on the first axis 780 and an output shaft 726 is positioned on a second axis 788. The first axis 780 and second axis 788 can be parallel to one another. In one embodiment, the two axes 780, 788 are parallel and coaxial with one another, but in an alternative embodiment the two axes 780, 788 are parallel and non-coaxial with one another.

A third axis 778 can include a variator assembly 714, variator shaft 716, and one of the three clutch assemblies (i.e., the C2 clutch assembly). A fourth axis 782 can include a layshaft 703, a pair of planetary gearsets 704, 720, and the other two clutch assemblies (i.e., the C1 clutch assembly and the C3 clutch assembly). The third axis 778 and fourth axis 782 can be parallel to one another, but the two axes are not coaxial. In this arrangement, the variator assembly 714 can be positioned adjacent to the planetary gearsets, not on a different axis or centerline, so that the overall length of the infinitely variable transmission is less than conventional infinitely variable transmissions. In one embodiment, the first axis 780, second axis 788, third axis 778, and fourth axis 782 can be parallel to one another, but no two axes are coaxial. In another embodiment, at least two of the four axes can be coaxial.

In this embodiment, the input coupler 701 is disposed on the first axis 780 and coupled to the input shaft 700. Referring to FIG. 7A, the input coupler can selectively transfer energy from a power source, PS, to the transmission. The power source, such as an engine or motor, provides power to drive the transmission. However, as described above, in the case of a diesel engine, the power source can cause damage to the variator assembly 714 during shutdown. Thus, to avoid possible damage to the variator assembly 714, the input coupler 701 can selectively couple a power source output, PSO, with the input shaft 700. The power source output can be a shaft, flywheel, etc.

During operation, the input coupler 701 can be engaged to facilitate the transfer of energy from the power source, PS, to the input shaft 700. It is also possible to disengage the input coupler 701 to prevent the transfer of energy to the input shaft 700. In this way, the variator assembly 714 is protected from a sudden kick back by the power source. In addition, during startup, the input coupler 701 can be disengaged to prevent torsional vibrations from being transmitted through the transmission. Accordingly, the infinitely variable transmission is setup similar to a conventional manual or automatic transmission during initial startup.

The input shaft 700 can be coupled to a first input gearset 702, which is formed of two meshing gears 728, 730. Gear 728 can be coupled or splined to the input shaft 700 such that the input shaft 700 and gear 728 are concentric with one another. Likewise, gear 730 can be coupled or splined to the layshaft 703 such that the layshaft 703 and gear 730 are concentric with one another.

The layshaft 703 can be coupled to a first planetary gearset 704, in particular, to a first ring gear 738 of the first planetary gearset 704. As the layshaft 703 rotates about its axis 782, the first ring gear 738 can rotate at substantially the same speed. The first ring gear 738 meshes with pinion gears of a first carrier assembly 740, and the pinion gears further mesh with a first sun gear 742. The first carrier assembly 740 and first sun gear 742 can transfer output torque to various components including a second output gearset 710 and a second planetary gearset 720. For example, the first carrier assembly 740 can transfer torque to a second ring gear 744 of the second planetary gearset 720 via a coupling 708 (e.g., housing, hub, shaft, spline, etc.). Like the first ring gear 738, the second ring gear 744 meshes with pinion gears of a second carrier assembly 746. The pinion gears of the second carrier assembly 746 also mesh with a second sun gear 748.

The first carrier assembly 740 can also couple to the second input gearset 710 via a shaft or other coupling. The second input gearset 710 comprises two meshing gears 732, 734. Torque can be transferred from the first carrier assembly 740 to gear 732 via gear 734. Gear 732 can be coupled or splined to the variator shaft 716, so torque transferred to gear 732 is in turn transferred to the variator shaft 716.

The variator shaft 716 is coupled to an input side of the variator assembly 714. The input side of the variator assembly 714 includes a pair of input discs 756, 758, also referred to as end discs. The input discs 756, 758 can transfer torque to a pair of output discs 760, 762 (i.e., center discs) via a plurality of rollers (not shown) and traction fluid (not shown). The output discs 760, 762 can be coupled to a shaft 718 and transfer torque to the third input gearset 712. Like the second input gearset 710, the third input gearset 712 includes a pair of meshing gears 750, 752. Gear 750 transfers torque to gear 752, which is coupled or splined to the C3 clutch assembly via shaft 764 or other coupling.

In the layout of FIG. 7B, there are two output gearsets 722, 724. The first output gearset 722 includes a pair of meshing gears 768, 772. In an alternative embodiment, the two gears 768, 772 can be coupled together via a first idler gearset (not shown) interposed therebetween. Gear 768 can be coupled or splined to one or more shafts including the variator shaft 716 along the axis 778. Gear 772 can be coupled or splined to the output shaft 726 such that torque can be transferred through the first output gearset 722 to the output shaft 726. The second output gearset 724 also includes two gears 770, 772 coupled to one another via a second idler gearset 776 interposed therebetween. Since the gear 772 is coupled or splined to the output shaft 726, torque can be transferred from the gear 770 to the output shaft 726 via gear 772 and idler gear 776.

In modes 1, 2, and 3, torque is transferred from the input shaft 700 to the output shaft 726 along similar paths as described above with reference to FIG. 4B. In particular, in mode 1 when the C1 clutch assembly is engaged, torque can be transferred from the input shaft 700 to the output shaft 726 via the first input gearset 702, layshaft 703, first ring gear 738, first carrier assembly 740, coupling 708, second ring gear 744, second carrier assembly 746, shaft 766, C1 clutch assembly, and second output gearset 724. In mode 2, when the C2 clutch assembly is engaged, torque can be transferred from the input shaft 700 to the output shaft 726 via the first input gearset 702, the layshaft 703, the first ring gear 738, the first carrier assembly 740, the second input gearset 710, the variator shaft 716, the C2 clutch assembly, and the first output gearset 722.

In the third operating mode, i.e., when the C3 clutch assembly is engaged, torque can be transferred through several torque paths from the input shaft 700 to the output shaft 726. First, torque can be transferred from the input shaft 700 to the output shaft 726 via the first input gearset 702, the layshaft 703, the first ring gear 738, the first carrier assembly 740, the second input gearset 710, the variator shaft 716, the variator assembly 714, shaft 718, the third input gearset 712, the shaft 764, the C3 clutch assembly, and the second output gearset 724. Also, torque can be transferred from the input shaft 700 to the output shaft 726 via the first input gearset 702, the layshaft 703, the first ring gear 738, the first carrier assembly 740, the first sun gear 742, the coupling 706 (e.g., housing, hub, shaft, spline, etc.), shaft 764, the C3 clutch assembly, and the second output gearset 724. Torque can further be transferred through the first carrier assembly 740, the coupling 708 (e.g., housing, hub, shaft, spline, etc.), the second ring gear 744, the second carrier assembly 746, the second sun gear 748, shaft 764, the C3 clutch assembly, and the second output gearset 724.

Figure 8A:
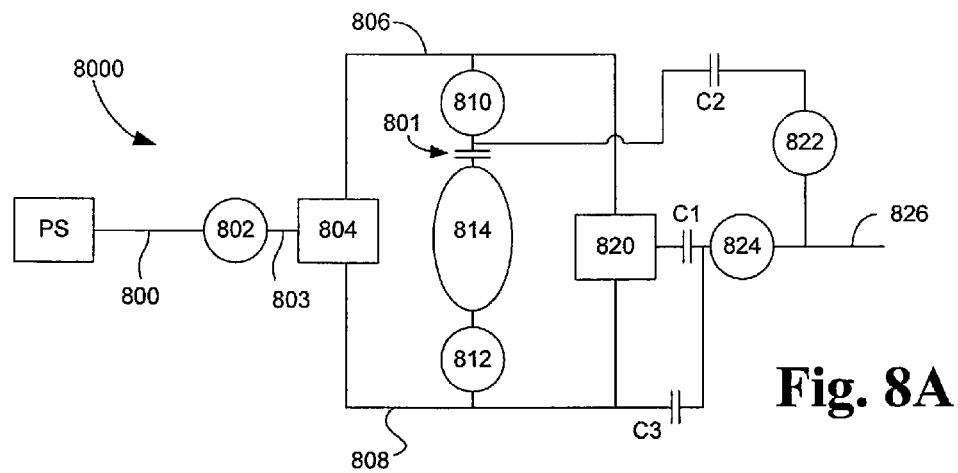
FIG. 8A is a schematic view of a gear configuration including an input coupler for an infinitely variable transmission.
Figure 8B:
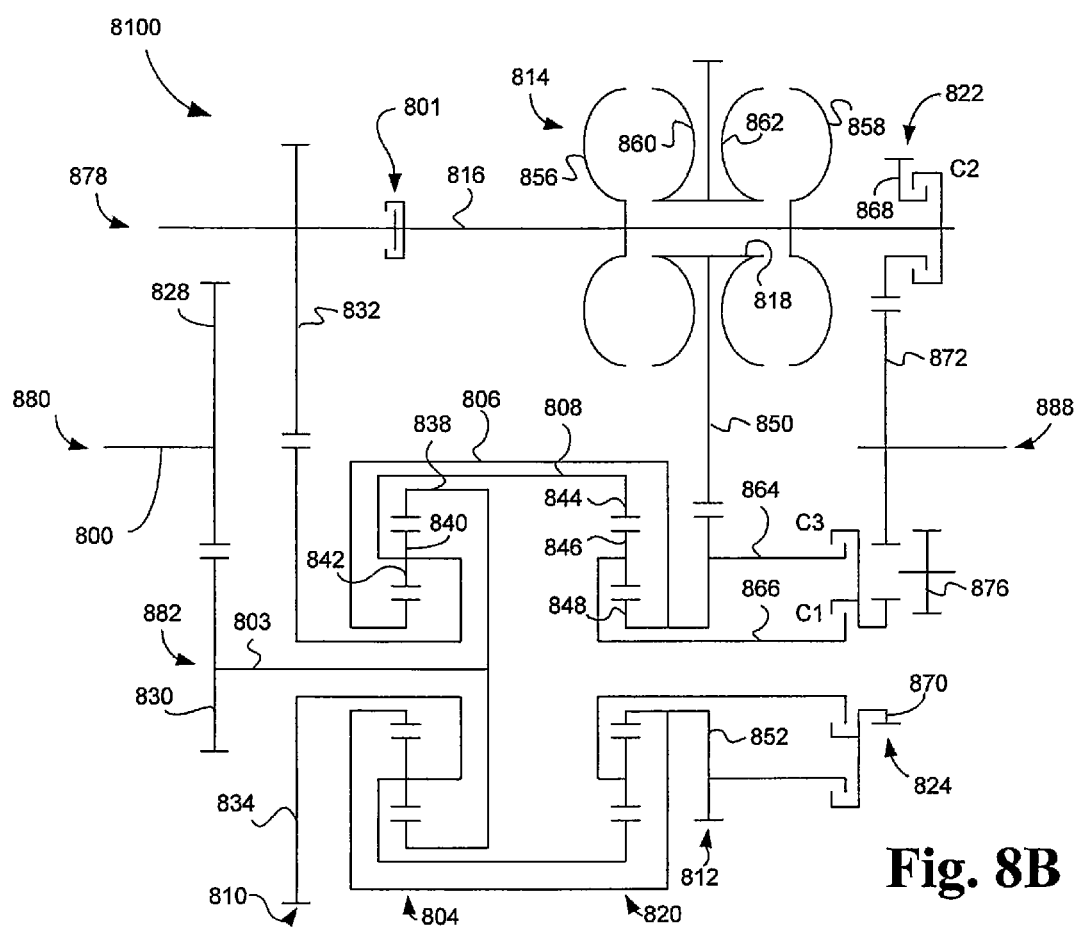
FIG. 8B is a layout diagram of the gear configuration of FIG. 8A.

In FIGS. 8A and 8B, an alternative embodiment is shown of a gearing configuration and corresponding layout of an infinitely variable transmission. One difference between the illustrated embodiment of FIGS. 8A and 8B compared to the illustrated embodiment of FIGS. 7A and 7B is the location of the input coupler. In FIG. 7A, for example, the input coupler 701 is coupled to the input shaft 700 and disposed between the power source, PS, and input shaft 700. In FIG. 8A, however, a different input coupler 801 is coupled to a variator shaft 816. The input coupler 801 can be a damper, for example, or a clutch assembly similar to the C1, C2, and C3 clutch assemblies. In this manner, if the input coupler 801 is the same type of clutch assembly as C1, C2, or C3, it can be cheaper to design and manufacture since the same type of clutch assembly is being used. Alternatively, the input coupler 801 can be a dry clutch assembly, a stand alone clutch assembly such as a rotating clutch, a sprag or roller clutch assembly or any combination thereof.

In the embodiment of FIGS. 8A and 8B, the input coupler 801 is coupled to an input of the variator assembly 814. The variator assembly 814 can include a pair of input discs 856, 858 and a pair of output discs 860, 862. In this configuration, the input coupler 801 can be coupled, directly or indirectly, to the input discs 856, 858 and transfer energy thereto. As such, the input coupler 801 can selectively transfer energy from a power source, e.g., engine, motor, etc., to the variator assembly 814. Of course, in this configuration, energy can already be transferred to an input shaft 800 of the transmission, but the input coupler 801 is advantageously positioned to prevent damage to the variator assembly during startup.

Since the gearing configuration and layout of FIGS. 8A and 8B, respectively, are similar to that of FIGS. 7A and 7B, particularly with respect to the other components (e.g., shafts, axes, gearsets, etc.), this embodiment will not be further described. The reference number corresponding to each component in FIGS. 8A and 8B is identical to the same component in FIGS. 7A and 7B except for the first number in the respective reference number begins with an '8' instead of a '7'. The infinitely variable transmission of FIGS. 8A and 8B can operate in three modes, similar to that described above, and may include various axes or centerlines.

In an alternative embodiment, an input coupler can also be coupled to the layshaft 703 and therefore be disposed along a layshaft centerline or axis (i.e., similar to the fourth axis 882). In this arrangement, the input coupler is still positioned between the vehicle's power source and variator assembly so that energy transferred through the transmission can be selectively transferred to the variator assembly. Similar to the embodiments described above, the input coupler can be selectively engaged or disengaged to allow or prevent the transfer of energy to the variator assembly.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An infinitely variable transmission having three operating modes, comprising:
 an input shaft;
 an output shaft spaced from the input shaft;
 a variator coupled between the input shaft and the output shaft, the variator including a first input disc; a second input disc, a first output disc, and a second output disc, wherein the first and second input discs are directly coupled to a first shaft and the first and second output discs are coupled directly to a second shaft, the first shaft being different from the second shaft;
 a plurality of planetary gearsets disposed adjacent to the variator;
 a first clutch assembly, a second clutch assembly, and a third clutch assembly, the first clutch assembly being engageable in a first mode, the second clutch assembly being engageable in a second mode, and a third clutch assembly being engageable in a third mode;
 wherein, the second clutch assembly is directly coupled to the first shaft and the first and second input discs;
 further wherein, in the first mode and with the first clutch assembly engaged, the transmission is operable in a reverse, a gear neutral, and a first forward mode.

2. The transmission of claim 1, wherein in each of the first mode, second mode, and third mode, only one of the first clutch assembly, the second clutch assembly, or the third clutch assembly is engaged.

3. The transmission of claim 1, further comprising a first output gearset, a second output gearset, and an idler gearset, wherein:
 the first output gearset includes a first gear and a second gear; and
 the second output gearset includes the second gear and a third gear.

4. The transmission of claim 3, wherein the first gear is directly coupled to the second clutch assembly.

5. The transmission of claim 3, wherein the third gear is directly coupled to the first clutch assembly.

6. The transmission of claim 3, wherein the second gear and the third gear are coupled to one another via the idler gearset.

7. The transmission of claim 3, wherein the second gear is directly coupled to the output shaft.

8. The transmission of claim 1, further comprising an input coupler configured to selectively transfer power from a power source to the variator and input shaft.

* * * * *